D. SMITH.

Assignor of Part Interest to C. W. M. Smith.

ICE-MACHINES.

No. 7,383. Reissued Nov. 7, 1876.

Attest:
Charles Thurman.
L. W. Seely

Inventor:
David Smith.
by Geo. W. Dyer
Atty.

UNITED STATES PATENT OFFICE.

DAVID SMITH, OF SAN FRANCISCO, CALIFORNIA, ASSIGNOR OF PART INTEREST TO C. W. M. SMITH.

IMPROVEMENT IN ICE-MACHINES.

Specification forming part of Letters Patent No. 173,357, dated February 8, 1876; reissue No. 7,383, dated November 7, 1876; application filed April 26, 1876.

*To all whom it may concern:*

Be it known that I, DAVID SMITH, of the city and county of San Francisco, State of California, have invented an Improvement in Machines for the Manufacture of Ice; and I do hereby declare that the following is a full, clear, and exact description of the same, reference being had to the accompanying drawings, and to the letters marked thereon.

This invention relates to that part of an ice-machine known as the "congealer;" and it consists of a water-tight freezing-box of suitable size for the work intended to be accomplished, constructed of thin metallic plates, within which is the zigzag coil of pipes which contains and conducts the freezing agent, the space between and around the pipes being filled up with a non-congealable fluid in a state of rest. This box is immersed in or surrounded by pure water, and the ice is formed on the outside and against the sides of the box as the freezing agent passes through the pipes.

The ice is detached from the plates or the sides of the box after withdrawing the non-congealable fluid through a cock at one end of the plates, and filling the box with water of the ordinary temperature, which causes the ice to separate from the plates, so that it can be removed, as will be more fully described hereafter.

To enable others skilled in the art to which my invention most nearly appertains to make and use the same, I will now proceed to describe its construction and manner of operation.

Figure 1:
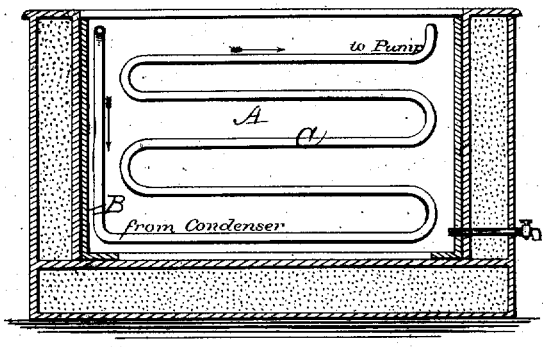
Figure 2:
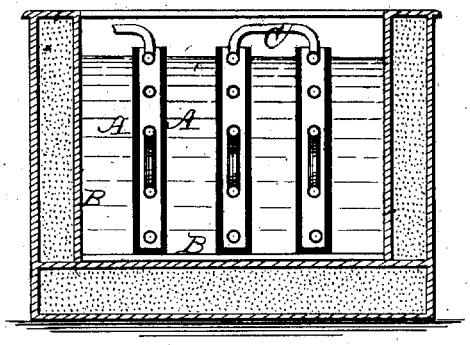
Figure 3:
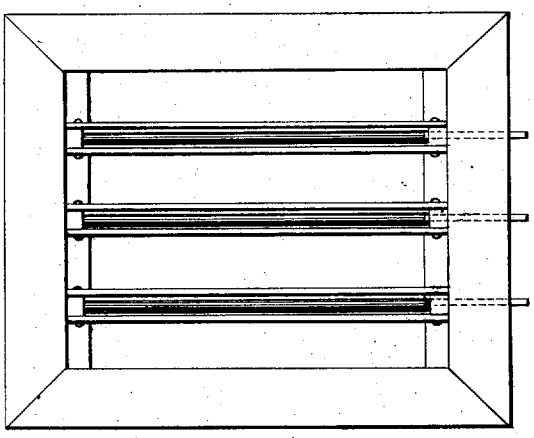
Figure 4:
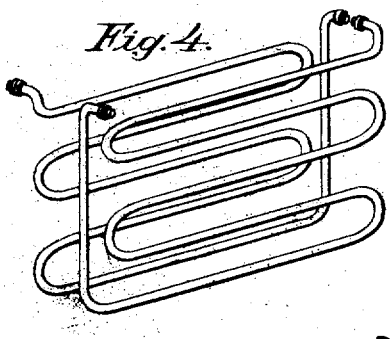

Referring to the drawings, Figure 1 shows a vertical longitudinal section through one of the congealer-boxes. Fig. 2 is a transverse section of the same. Fig. 3 is a plan view of the tank and the boxes with the pipes removed. Fig. 4 is a perspective view of two sections of pipe.

The congealer is constructed in the form of a long and narrow box, of sufficient width to receive the evaporating-coil easily, by employing two sheets, A A, of suitable thickness and size—say, No. 10 metal, about ten feet long and three and one-half feet deep—and for a larger-sized machine two or more plates are joined together to form the side of the box. These sheets are riveted, screwed, or otherwise fastened together at the ends and bottom, with a sufficient thickness of wood, B, between them to make a tight box of proper width to receive the evaporator-coil C. These pipes or coils are made either of lead or iron, about one inch in diameter, and they enter at the top of the congealer at E, and extend down vertically to the bottom of the box; thence back and forth longitudinally upward and out at F, as shown in Figs. 1 and 4 of the drawing; then to connect with the pump of the apparatus, or to join the next coil, which is constructed in like manner; or the pipe of each box may pass out through the tank, and be connected on the outside of the box.

The boxes are made water-tight, for the purpose of holding a non-congealable liquid in a state of rest, such as brine or chloride of calcium, for acting as a medium between the water and the congealing agent to extract the heat from the water to be frozen, and also to cause the ice to be formed of an equal thickness over the entire surface of the plates.

By constructing the congealer-boxes of only sufficient width to receive the evaporator-coils, and with a thin sheet of non-congealable fluid intervening between the outer sides of the coil and the inner sides of the plates, great advantages are derived, as the necessity of cooling down a large body of the non-congealable liquid is avoided, and the removal of the ice is facilitated and cheapened, as it will not be necessary to remove the non-congealable liquid in order to detach the ice.

In practice and by repeated experiments, I have found that in order to produce ice of uniform thickness on the plates two things are essential—first, to cause the refrigerating fluid to enter the bottom of the coil in the congealing box; and, second, constructing and placing the pipes nearer together at the top than at the bottom, as shown in the drawing. This I deduce from the fact that after the temperature of the water of which the ice is formed has passed below 38° Fahrenheit, (its maximum density,) the water becomes lighter as well as colder, and has a tendency to rise, and by permitting the refrigerant to enter at the bottom of the evaporating-coil first, where it exerts its frigorific effect with the greatest energy, the bottom and middle portion of the freezing-plate is made equal in temperature; but the top of the freezing-plate being in more immediate contact with the atmosphere of the room, which is always several degrees warmer than the freezing-point, the top part of the refrigerating-box containing the apparatus is not so readily acted upon or so easily reduced; hence it becomes necessary to increase the refrigerating-surface near the top of the tank by increasing the length of pipe through which the freezing-gas passes to such a degree that the warming of the atmosphere is overcome, and the non-congealable liquid cooled down equally.

Fig. 3 represents a plan of the tank with the boxes in place, of which Figs. 1 and 2 are sectional views. This tank is built of wood or iron, with double walls and bottom, and the space between is filled with sawdust, charcoal, or any other non-conductor.

The congealing-boxes are placed, as shown in the drawing, at a sufficient distance from the bottom of the tank to prevent the ice forming too near the base, and to give space for the circulation of the water between the boxes, and also to permit the more perfect and convenient cleaning of such space, and of the spaces between the bottom of the boxes and the tank, and each congealer-box is provided with a waste-cock, *c*, through which the brine or non-congealable liquid may be drawn off.

It will be seen that the metal sides of the boxes do not extend entirely across the tank, the wooden ends to which the plates are bolted projecting by the iron about four inches, as shown at B, thus preventing the ends of the congealing-plate from coming in close contact with the sides of the tank. The wooden ends of the congealing-boxes are thus bolted fast to the walls of the tank, thereby sustaining the plates in position, as well as preventing the straining of the tank by the great outward pressure of water in a larger machine.

In practice, the tank is built to contain as many congealing-boxes, and of such size, as is required, and these are placed in position about two feet apart. These pipes are then placed inside the boxes and connected, the inlet-pipe E with the receiver of liquid from the condenser, and the outlet-pipe F with the inlet-pipe of the next coil, *a*, or with the pump direct, if no more than one coil is used, and when the apparatus is charged with ammoniacal gas and the tank is filled with pure, clear water, and the congealing-boxes are filled with brine, the circulation of the gas begins as the pumps are put in motion.

The non-congealable liquid remaining at rest in the congealing-boxes is relieved of its sensible heat by the expansion of the liquid refrigerant within the pipes surrounded by the non-congealable liquid at rest, and this, by absorbing the heat from the water on the outside in contact with the congealing-plates, causes the ice to form on the sides of the boxes, and increase in thickness as long as the circulation and expansion of the gas is continued.

When the ice has reached the desired thickness on the sides of the congealer it is easily detached by drawing off the non-congealable liquid from the boxes by the cock *c*, and then filling the boxes with water at any temperature above 32° Fahrenheit. This water, which acts to raise the temperature and thereby detach the ice from the plates, is drawn off through the outlet-pipe, and then the brine is pumped back into the congealing-boxes to be used again.

The boxes not being more than two inches thick, but a very small quantity of brine is used, and the labor and power required or necessary in discharging and refilling the boxes is very small.

It will be seen from the above description that by the employment of a non-congealable liquid in a state of rest inclosed in a narrow congealing-box, and containing a vaporizing-coil, as before described, a marked beneficial and novel result is produced, as the ice is readily formed evenly over the whole surface of the plates without the use of agitators or apparatus to circulate the non-congealable liquid through the congealing-boxes, and by employing the non-congealable liquid at rest in the congealing-boxes the warm air of the room cannot affect it to disadvantage as when agitated, for the reason that the pipes of the coil at the top, being nearer together, give a proportionately larger surface and keep the temperature equal; also, that the induction end of the pipe, always running to the bottom of the congealing-box first, thereby tends to exert its greatest energy and cause an upward tendency to the non-congealable liquid as it gets colder. It will also be seen that the liquid refrigerant, always entering at the bottom of the coil and traveling upward, is considerably retarded in its speed, thereby giving the atoms of liquid ammonia a better chance to vaporize by absorbing more heat from the water to be frozen.

It will also be noticed from the foregoing description that the pipes for conducting the refrigerant are of a novel and peculiar construction; that the sides of the congealing-boxes are constructed with plain surfaces, on which the ice forms easily, and, therefore, more readily and of a better quality, and is detached with much less heat, and with much less damage to the ice, than when hot gas is used, and with a great saving of time, and without disturbing the freezing action; also, that the metal sides of the congealing-boxes do not reach to the sides of the main tank or to the bottom, thereby leaving the cake of ice free when it is thawed from the plate.

Having thus described my invention, what I claim as new, and desire to secure by Letters Patent, is—

1. In combination with a proper tank, a congealer having metallic sides and wooden ends and bottom, and isolated at the bottom thereof, except at the ends, from the bottom of the tank, substantially as and for the purposes set forth.

2. In combination with a congealer, the evaporating-coil C, with the pipe arranged in the same vertical plane, and having an increasing space downward between the pipes, substantially as and for the purposes described.

3. The evaporator-coil C, constructed and arranged with the condenser end of the pipe bent directly down to its lowest point, then extended at right angles across the condenser, and then bent back and forth across the same, in the same vertical plane to the top of the same, substantially as and for the purposes set forth.

4. In combination, a congealer and an evaporator-coil, arranged vertically within the same, and occupying nearly the entire space from side to side of the same, for the purpose of admitting only a thin film of the non-congealable fluid in such space, substantially as and for the purposes described.

5. In combination, in a congealer-box, an evaporating-coil, arranged vertically within the same, and occupying nearly the entire space from side to side of the same, and a thin film of non-congealable fluid in the same in a state of rest, substantially as described.

Witness my hand this 3d day of April, A. D. 1876.

DAVID SMITH.

Witnesses:

A. G. ANTHONY,

WILLIAM W. OSBORN.